("12") United States Patent  
Kim

(10) Patent No.: US 11,599,464 B2  
(45) Date of Patent: Mar. 7, 2023

(54) MEMORY CONTROLLER AND METHOD OF OPERATING THE SAME

(71) Applicant: SK hynix Inc., Icheon (KR)

(72) Inventor: Do Hun Kim, Icheon (KR)

(73) Assignee: SK hynix Inc., Icheon (KR)

( * ) Notice: Subject to any disclaimer, the term of this patent is extended or adjusted under 35 U.S.C. 154(b) by 88 days.

(21) Appl. No.: 16/995,567

(22) Filed: Aug. 17, 2020

(65) Prior Publication Data

US 2021/0365372 A1 Nov. 25, 2021

(30) Foreign Application Priority Data

May 21, 2020 (KR) .................. 10-2020-0061130

(51) Int. Cl.
*G06F 12/00* (2006.01)
*G06F 12/0804* (2016.01)

(52) U.S. Cl.
CPC .. *G06F 12/0804* (2013.01); *G06F 2212/1032* (2013.01); *G06F 2212/608* (2013.01)

(58) Field of Classification Search
CPC ......... G06F 12/0804; G06F 2212/1032; G06F 2212/608
See application file for complete search history.

(56) References Cited

U.S. PATENT DOCUMENTS

| | | | |
|---|---|---|---|
| 4,484,262 A * | 11/1984 | Sullivan | G06F 12/0804 711/E12.04 |
| 5,509,132 A | 4/1996 | Matsuda et al. | |
| 5,604,753 A | 2/1997 | Bauer et al. | |
| 5,751,995 A * | 5/1998 | Sarangdhar | G06F 12/0831 711/146 |
| 5,815,136 A | 9/1998 | Ikeda et al. | |
| 6,101,596 A * | 8/2000 | Tanaka | G06F 9/3857 712/216 |
| 6,490,642 B1 | 12/2002 | Thekkath et al. | |

(Continued)

FOREIGN PATENT DOCUMENTS

| | | |
|---|---|---|
| KR | 100293276 B1 | 9/2001 |
| KR | 101014040 B1 | 2/2011 |

(Continued)

OTHER PUBLICATIONS

Office Action dated Nov. 24, 2020 for U.S. Appl. No. 17/104,973.

(Continued)

*Primary Examiner* — Shawn X Gu
*Assistant Examiner* — Mohammad S Hasan

(57) ABSTRACT

An electronic device includes a memory controller having an improved operation speed. The memory controller includes a main memory, a processor configured to generate commands for accessing data stored in the main memory, a scheduler configured to store the commands and output the commands according to a preset criterion, a cache memory configured to cache and store data accessed by the processor among the data stored in the main memory, and a hazard filter configured to store information on an address of the main memory corresponding to a write command among the commands, provide a pre-completion response for the write command to the scheduler upon receiving the write command, and provide the write command to the main memory.

19 Claims, 14 Drawing Sheets

(56) References Cited

U.S. PATENT DOCUMENTS

| | | | |
|---|---|---|---|
| 6,621,829 B1 | 9/2003 | Achilles et al. | |
| 7,091,979 B1* | 8/2006 | Donovan | G06T 15/005 |
| | | | 345/530 |
| 7,349,398 B1 | 3/2008 | Favor et al. | |
| 8,046,551 B1 | 10/2011 | Sahin | |
| 8,112,595 B1 | 2/2012 | Bar-El | |
| 8,135,918 B1 | 3/2012 | Yueh | |
| 8,464,008 B1 | 6/2013 | Bar-El | |
| 8,909,860 B2 | 12/2014 | Rao | |
| 9,851,905 B1 | 12/2017 | Ramalingam et al. | |
| 9,983,380 B2 | 5/2018 | Ware et al. | |
| 10,612,684 B2 | 4/2020 | Grajeda et al. | |
| 2003/0051099 A1 | 3/2003 | Yoaz et al. | |
| 2003/0120880 A1 | 6/2003 | Banno | |
| 2004/0128432 A1* | 7/2004 | Nakajima | G06F 11/1441 |
| | | | 711/156 |
| 2006/0136656 A1* | 6/2006 | Conley | G06F 12/0246 |
| | | | 711/E12.04 |
| 2006/0161724 A1* | 7/2006 | Bennett | G06F 12/0246 |
| | | | 711/E12.008 |
| 2008/0086575 A1 | 4/2008 | Foong et al. | |
| 2008/0288752 A1* | 11/2008 | Cox | G06F 9/3834 |
| | | | 712/E9.048 |
| 2008/0294813 A1* | 11/2008 | Gorobets | G06F 12/0246 |
| | | | 710/62 |
| 2009/0300297 A1 | 12/2009 | Ikeuchi et al. | |
| 2010/0039996 A1 | 2/2010 | Ohta et al. | |
| 2010/0095073 A1 | 4/2010 | Caulkins | |
| 2010/0205406 A1* | 8/2010 | Hooker | G06F 9/3836 |
| | | | 712/E9.034 |
| 2010/0205407 A1* | 8/2010 | Henry | G06F 9/3802 |
| | | | 712/216 |
| 2010/0287333 A1* | 11/2010 | Lee | G06F 12/0873 |
| | | | 711/135 |
| 2011/0022779 A1 | 1/2011 | Lund et al. | |
| 2011/0040906 A1* | 2/2011 | Chung | G06F 5/16 |
| | | | 711/E12.001 |
| 2011/0047437 A1 | 2/2011 | Flynn | |
| 2011/0072196 A1 | 3/2011 | Forhan et al. | |
| 2012/0144448 A1 | 6/2012 | Gunawardena et al. | |
| 2012/0297147 A1* | 11/2012 | Mylly | G06F 12/0246 |
| | | | 711/143 |
| 2012/0324250 A1* | 12/2012 | Chakraborty | G06F 1/329 |
| | | | 713/300 |
| 2013/0124794 A1 | 5/2013 | Bux et al. | |
| 2013/0205097 A1 | 8/2013 | Flynn et al. | |
| 2014/0059275 A1 | 2/2014 | Yun et al. | |
| 2014/0281806 A1 | 9/2014 | Sharon et al. | |
| 2014/0297603 A1 | 10/2014 | Kim et al. | |
| 2014/0325153 A1* | 10/2014 | Huang | G06F 12/0607 |
| | | | 711/122 |
| 2015/0095579 A1* | 4/2015 | Samih | G06F 13/16 |
| | | | 711/129 |
| 2015/0317089 A1 | 11/2015 | Ho | |
| 2015/0356019 A1 | 12/2015 | Johar et al. | |
| 2015/0370734 A1 | 12/2015 | Mangano et al. | |
| 2016/0006461 A1 | 1/2016 | Yin et al. | |
| 2016/0077749 A1* | 3/2016 | Ravimohan | G06F 3/064 |
| | | | 711/103 |
| 2016/0162416 A1 | 6/2016 | Boyd et al. | |
| 2016/0224603 A1 | 8/2016 | Yang et al. | |
| 2016/0230962 A1 | 8/2016 | Yan et al. | |
| 2016/0328161 A1 | 11/2016 | Huang et al. | |
| 2017/0004095 A1* | 1/2017 | Takeda | G06F 3/0685 |
| 2017/0031615 A1 | 2/2017 | Lee | |
| 2017/0031626 A1 | 2/2017 | Kim et al. | |
| 2017/0046259 A1* | 2/2017 | McKean | G06F 3/06 |
| 2017/0075823 A1 | 3/2017 | Ward et al. | |
| 2017/0131951 A1 | 5/2017 | Miura | |
| 2017/0242752 A1 | 8/2017 | Lee | |
| 2017/0286421 A1* | 10/2017 | Hayenga | G06F 16/172 |
| 2017/0344366 A1* | 11/2017 | Beard | G06F 12/084 |
| 2018/0004698 A1 | 1/2018 | Brouwer et al. | |
| 2018/0006963 A1 | 1/2018 | Brouwer et al. | |
| 2018/0052613 A1* | 2/2018 | McDaniel | G06F 9/3834 |
| 2018/0074850 A1* | 3/2018 | Benjamini | G06F 9/505 |
| 2018/0074979 A1 | 3/2018 | Tanaka et al. | |
| 2018/0130537 A1 | 5/2018 | Kim et al. | |
| 2018/0173654 A1 | 6/2018 | Hong et al. | |
| 2018/0239701 A1 | 8/2018 | Baptist et al. | |
| 2018/0253353 A1 | 9/2018 | Takase | |
| 2018/0374550 A1 | 12/2018 | Barndt et al. | |
| 2019/0129971 A1 | 5/2019 | Hironaka et al. | |
| 2019/0146911 A1 | 5/2019 | Ha et al. | |
| 2019/0266096 A1* | 8/2019 | Lee | G06F 3/061 |
| 2020/0142636 A1 | 5/2020 | Liao | |
| 2020/0226050 A1* | 7/2020 | Lyberis | G06F 11/366 |
| 2020/0319821 A1 | 10/2020 | Sallese et al. | |
| 2021/0055864 A1 | 2/2021 | Noh et al. | |
| 2021/0157590 A1* | 5/2021 | King | G06F 9/30043 |
| 2021/0157721 A1 | 5/2021 | Kim et al. | |
| 2021/0191863 A1 | 6/2021 | Choi et al. | |
| 2021/0200470 A1* | 7/2021 | Chan | G06F 3/0656 |

FOREIGN PATENT DOCUMENTS

| | | |
|---|---|---|
| KR | 1020130032157 A | 4/2013 |
| KR | 20150138713 A | 12/2015 |
| KR | 20160035737 A | 4/2016 |
| KR | 101711945 B1 | 3/2017 |
| KR | 20170070920 A | 6/2017 |
| KR | 101790165 B1 | 11/2017 |
| KR | 101858159 B1 | 6/2018 |
| KR | 1020180080589 A | 7/2018 |
| KR | 20180104830 A | 9/2018 |
| KR | 20190054974 A | 5/2019 |
| KR | 101992934 B1 | 6/2019 |
| KR | 20190067088 A | 6/2019 |
| KR | 102002925 B1 | 7/2019 |
| KR | 20190082584 A | 7/2019 |
| KR | 1020190109987 A | 9/2019 |
| KR | 1020200019431 A | 2/2020 |
| KR | 1020200095103 A | 8/2020 |

OTHER PUBLICATIONS

Notice of allowance dated Jun. 24, 2021 for U.S. Appl. No. 16/887,520.

Office Action dated Oct. 7, 2020 for U.S. Appl. No. 16/111,044.

Office Action dated May 2, 2022 for U.S. Appl. No. 17/036,960.

* cited by examiner

FIG. 5

Valid Page Table READ (501)

| bit1 | bit2 | bit3 | bit4 | bit5 | bit6 | bit7 | bit8 | bit9 | bit10 | ... |
|---|---|---|---|---|---|---|---|---|---|---|
| Clear | Clear | Clear | Clear | Clear | Clear | Clear | Clear | Clear | Clear | ... |

⇩

Valid Page Table MODIFY-WRITE (503)

| bit1 | bit2 | bit3 | bit4 | bit5 | bit6 | bit7 | bit8 | bit9 | bit10 | ... |
|---|---|---|---|---|---|---|---|---|---|---|
| Set | Clear | Clear | Clear | Clear | Clear | Clear | Clear | Clear | Clear | ... |

⇩

Valid Page Table READ (505)

| bit1 | bit2 | bit3 | bit4 | bit5 | bit6 | bit7 | bit8 | bit9 | bit10 | ... |
|---|---|---|---|---|---|---|---|---|---|---|
| Set | Clear | Clear | Clear | Clear | Clear | Clear | Clear | Clear | Clear | ... |

⇩

Valid Page Table MODIFY-WRITE (507)

| bit1 | bit2 | bit3 | bit4 | bit5 | bit6 | bit7 | bit8 | bit9 | bit10 | ... |
|---|---|---|---|---|---|---|---|---|---|---|
| Set | Set | Clear | Clear | Clear | Clear | Clear | Clear | Clear | Clear | ... |

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2020-0061130, filed on May 21, 2020, in the Korean Intellectual Property Office, the entire disclosure of which is incorporated herein by reference.

BACKGROUND

1. Field of Invention

The present disclosure relates to an electronic device, and more particularly, to a memory controller and a method of operating the same.

2. Description of Related Art

A storage device is a device that stores data under the control of a host device such as a computer or a smartphone. A storage device may include a memory device storing data and a memory controller controlling the memory device. The memory device may be classified into a volatile memory device and a non-volatile memory device.

The volatile memory device may be a device that stores data only when power is supplied thereto and loses the stored data when the power supply is cut off. The volatile memory device may include a static random access memory (SRAM), a dynamic random access memory (DRAM), and the like.

The non-volatile memory device is a device that does not lose stored data even when power is cut off. The non-volatile memory device may include a read only memory (ROM), a programmable ROM (PROM), an electrically programmable ROM (EPROM), an electrically erasable and programmable ROM (EEPROM), a flash memory, and the like.

SUMMARY

Embodiments of the present disclosure provide a memory controller having an improved operation speed, and a method of operating the same.

A memory controller according to an embodiment of the present disclosure may include a main memory, a processor configured to generate commands for accessing data stored in the main memory, a scheduler configured to store the commands and output the commands according to a preset criterion, a cache memory configured to cache and store data accessed by the processor among the data stored in the main memory and a hazard filter configured to store information on an address of the main memory corresponding to a write command among the commands, provide a pre-completion response for the write command to the scheduler upon receiving the write command, and provide the write command to the main memory.

A memory controller according to an embodiment of the present disclosure may include a main memory including main data stored in areas corresponding to a plurality of main memory addresses, a cache memory configured to cache and store a portion of the main data in cache lines corresponding to the plurality of main memory addresses, a processor configured to generate commands for accessing the main data, a scheduler configured to provide the commands to the cache memory according to a sequence of generating the commands and a hazard filter configured to provide a pre-write completion response to the scheduler in response to a write command among the commands, and provide the write command to the main memory to perform an operation corresponding to the write command.

BRIEF DESCRIPTION OF THE DRAWINGS

FIG. 5 is a diagram for describing a read-modify-write operation of a valid page table (VPT) of a physical address.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Figure 1:
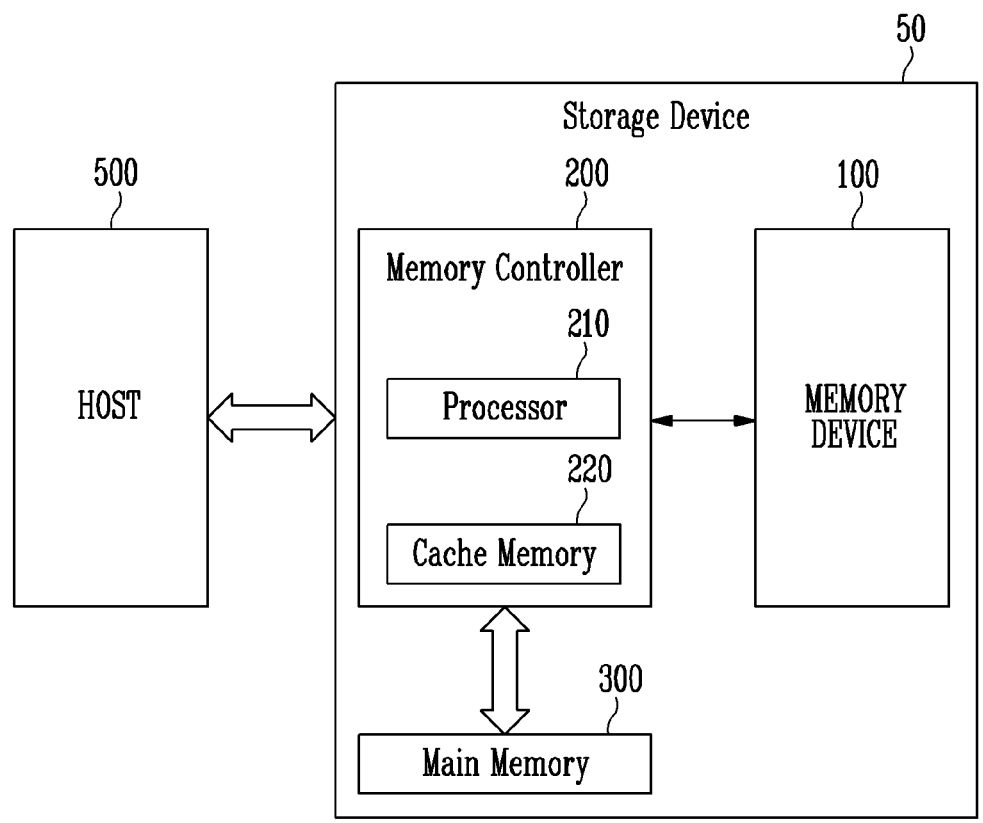
FIG. 1 is a diagram for describing a storage device according to an embodiment of the present disclosure.

FIG. 1 is a diagram for describing a storage device 50 according to an embodiment of the present disclosure.

Referring to FIG. 1, the storage device 50 may include a memory device 100 and a memory controller 200 that controls an operation of the memory device 100. The storage device 50 may be a device that stores data under the control of a host 500 such as a cellular phone, a smartphone, an MP3 player, a laptop computer, a desktop computer, a game player, a TV, a tablet PC, an in-vehicle infotainment system, or the like.

The storage device 50 may be one of various types of storage devices according to a host interface that is a communication method with the host 500. For example, the storage device 50 may include one of an SSD, a multimedia card in the form of an MMC, an eMMC, an RS-MMC, or a micro-MMC, a secure digital card in the form of an SD, a mini-SD, or a microSD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so on.

The storage device 50 may be manufactured as one of various types of packages. For example, the storage device 50 may be manufactured as one of a package on package (POP), a system in package (SIP), a system on chip (SOC), a multi-chip package (MCP), a chip on board (COB), a wafer-level fabricated package (WFP), a wafer-level stack package (WSP), and so on.

The memory device 100 may store data. The memory device 100 operates under the control of the memory controller 200. The memory device 100 may include a memory cell array (not shown) including a plurality of memory cells that store data.

Each of the memory cells may be configured as a single level cell (SLC) that stores one-bit data, a multi-level cell (MLC) that stores two-bit data, a triple level cell (TLC) that stores three-bit data, or a quad level cell (QLC) capable of storing four-bit data.

The memory cell array (not shown) may include a plurality of memory blocks. One memory block may include a plurality of pages. In an embodiment, a page may be a unit for storing data in the memory device 100 or reading data stored in the memory device 100. A memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command CMD and an address ADDR from the memory controller 200 and access an area selected by the address ADDR in the memory cell array. The memory device 100 may perform an operation instructed by the command CMD on the area selected by the address ADDR. For example, the memory device 100 may perform a write operation (or program operation), a read operation, and an erase operation in response to the command CMD. During the program operation, the memory device 100 may program data in the area selected by the address ADDR. During the read operation, the memory device 100 may read data from the area selected by the address ADDR. During the erase operation, the memory device 100 may erase data stored in the area selected by the address ADDR.

The memory controller 200 may control an overall operation of the storage device 50.

When power is applied to the storage device 50, the memory controller 200 may execute firmware (FW). When the memory device 100 is a flash memory device, the firmware (FW) may include a host interface layer (HIL) that controls communication with the host 500, a flash translation layer (FTL) that controls communication between the memory controller 200 and the host 500, and a flash interface layer (FIL) that controls communication with the memory device 100.

In an embodiment, the memory controller 200 may receive data and a logical block address (LBA) from the host 500 and may convert the LBA into a physical block address (PBA) indicating an address of memory cells in the memory device 100 in which the received data is to be stored. In the present specification, the LBA and a "logic address" or a "logical address" may be used as having the same meaning. In the present specification, the PBA and a "physical address" may be used as having the same meaning.

The memory controller 200 may control the memory device 100 to perform the program operation, the read operation, or the erase operation according to a request of the host 500. During the program operation, the memory controller 200 may provide a write command, a PBA, and write data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may generate a command, an address, and data regardless of whether there is a request from the host 500, and transmit the command, the address, and the data to the memory device 100. For example, the memory controller 200 may provide a command, an address, and data for performing a read operation and program operations accompanying in performing wear leveling, read reclaim, garbage collection, and the like, to the memory device 100.

In an embodiment, the memory controller 200 may control two or more memory devices 100. In this case, the memory controller 200 may control the two or more memory devices 100 according to an interleaving method to improve operation performance. The interleaving method may be a method of controlling operations for the two or more memory devices 100 to overlap with each other.

The storage device 50 may further include a main memory 300. The main memory 300 may temporarily store data provided from the host 500 or may temporarily store data read from the memory device 100. In an embodiment, the main memory 300 may be a volatile memory device. For example, the main memory 300 may include a dynamic random access memory (DRAM), or a static random access memory (SRAM), or both.

In an embodiment, the main memory 300 may read meta data stored in the memory device 100 and store the read meta data therein.

The meta data may be data including various information required to control the storage device 50. For example, the meta data may include bad block information, which is information on a bad block among a plurality of memory blocks included in the memory device 100, and firmware to be executed by a processor 210 of the memory controller 200.

In an embodiment, the meta data may include map data indicating a correspondence relationship between the logical address provided by the host 500 and a physical address of memory cells included in the memory device 100, and a valid page table indicating whether data stored in pages included in the memory device 100 are valid data. In an embodiment, the valid page table may include a plurality of valid page tables. The valid page table may include data of a bitmap form indicating whether data stored in a page in a 4 KB unit are valid.

Alternatively, in various embodiments, the meta data may include read count data indicating the number of times of read operations performed on the memory blocks included in the memory device 100, cycling data indicating the number of times of erasures of the memory blocks included in the memory device 100, hot/cold data indicating whether data stored in pages included in the memory device 100 is hot data or cold data, and journal data indicating a changed content of the map data.

In an embodiment, the meta data stored in the main memory 300 may include data chunks having different types of data structures for types of the meta data. For example, the meta data may have different data sizes for the types thereof. Therefore, for the types of the meta data, the sizes of the meta data stored in the main memory 300 may be different from each other.

In an embodiment of the present disclosure, the memory controller 200 may include the processor 210 and a cache memory 220.

The processor 210 may control overall operations of the memory controller 200. The processor 210 may execute firmware (FW). The processor 210 may perform operations required to access the memory device 100. For example, the processor 210 may provide a command to the memory device 100 and control the memory device 100 and the main memory 300 to perform an operation corresponding to the command.

For example, when a write request is received from the host 500, the processor 210 may convert a logical address corresponding to the write request into a physical address. The processor 210 may store map data, which indicates a correspondence relationship between the logical address and the physical address, in the main memory 300.

In order to store the map data, the processor 210 may read a map segment including mapping information of the logical address provided by the host 500 from the main memory 300. Thereafter, the processor 210 may record the physical address corresponding to the logical address in the map segment. The processor 210 may store the map segment in which the physical address is recorded in the main memory 300 again. When the physical address is allocated, data of a valid page table corresponding to the allocated physical address may also be updated.

In an embodiment, the map data stored in the main memory 300 may be updated. For example, when a write request of new data is input with respect to a previously write requested logical address, previously stored data may become invalid data, and a physical address corresponding to the corresponding logical address may be changed. Alternatively, when a position where data is stored is changed by various background operations such as garbage collection, read reclaim, and wear leveling, the map data corresponding to the position of the data may be updated.

The cache memory 220 may store data to be accessed by the processor 210, the data being read from the main memory 300. A storage capacity of the cache memory 220 may be smaller than that of the main memory 300. In an embodiment, the cache memory 220 may be a volatile memory device. For example, the cache memory 220 may be a dynamic random access memory (DRAM) or a static random access memory (SRAM). The cache memory 220 may be a memory having an operation speed faster than that of the main memory 300.

Since the storage capacity of the cache memory 220 is smaller than that of the main memory 300, the cache memory 220 may store only meta data accessed by the processor 210 among the meta data stored in the main memory 300. Storing data, which stored in a specific address among the data stored in the main memory 300, in the cache memory 220 is referred to as caching.

When the cache memory 220 stores data to be accessed by the processor 210 that is read from the main memory 300, the cache memory 220 may provide the corresponding data to the processor 210. Since the operation speed of the cache memory 220 is faster than that of the main memory 300, when the data to be accessed by the processor 210 is stored in the cache memory 220, the processor 210 may obtain the data faster than obtaining the data from the main memory 300. A case where the data to be accessed by the processor 210 is stored in the cache memory 220 is referred to as a cache hit, and a case where the data to be accessed by the processor 210 is not stored in the cache memory 220 is referred to as a cache miss. As the number of cache hits increases, a speed of an operation processed by the processor 210 may be increased.

An operation method of the cache memory 220 may be classified into a direct mapped cache, a set associative cache, or a fully associative cache.

The direct mapped cache may be a many-to-one (n:1) method in which a plurality of addresses of the main memory 300 correspond to one address of the cache memory 220. That is, in the direct mapped cache, data stored in a specific address of the main memory 300 may be cached in a pre-mapped address of the cache memory 220.

The fully associative cache may be an operation method in which an address of the cache memory 220 is not pre-mapped to a specific address of the main memory 300 and thus an address of an empty portion of the cache memory 220 may cache data stored in any address of the main memory 300. The fully associative cache is required to search for all addresses of the cache memory 220 when determining whether there is a cache hit or not.

The set associative cache is an intermediate form of the direct mapped cache and the fully associative cache, and manages the cache memory 220 by dividing the cache memory 220 into a plurality of cache sets. In addition, a cache set may be divided into cache ways or cache lines.

The host 500 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
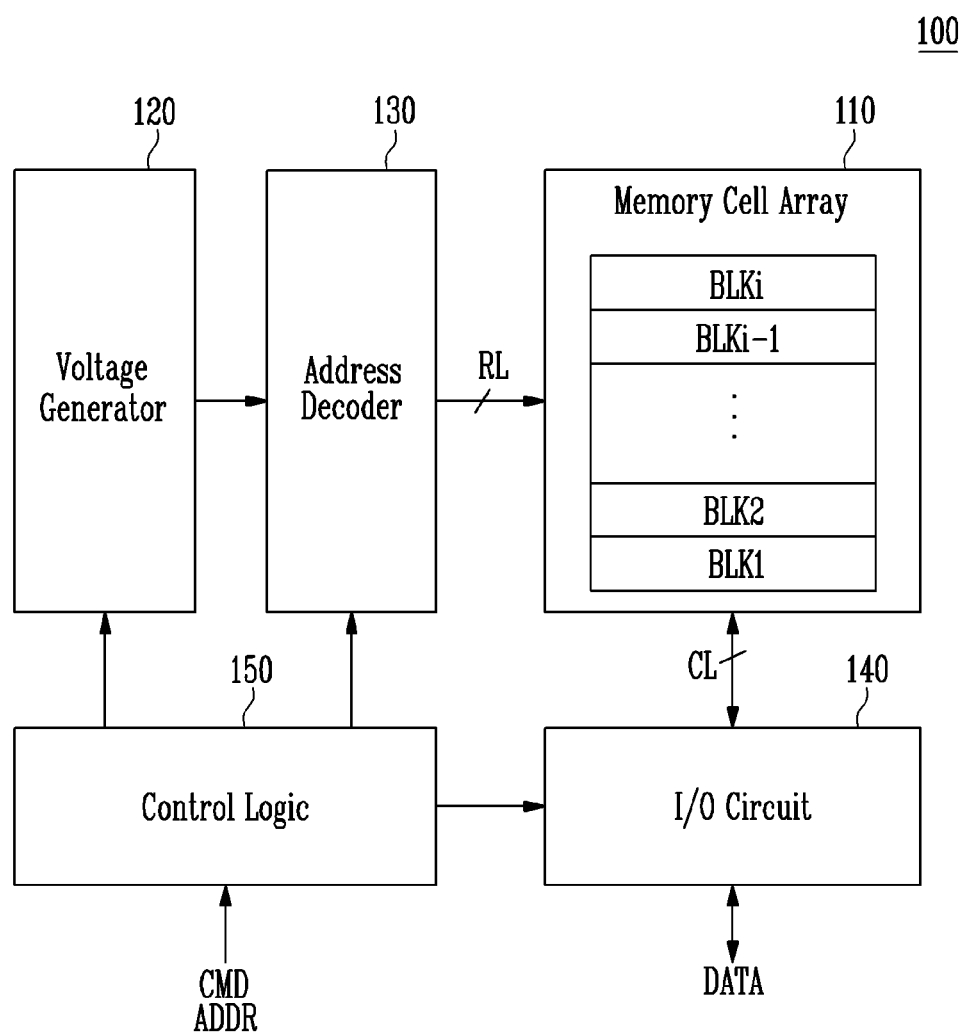
FIG. 2 is a diagram for describing a memory device of FIG. 1.

FIG. 2 is a diagram for describing the memory device 100 of FIG. 1.

Referring to FIG. 2, the memory device 100 may include a memory cell array 110, a voltage generator 120, an address decoder 130, an input/output (I/O) circuit 140, and a control logic 150.

The memory cell array 110 includes a plurality of memory blocks BLK1 to BLKi, i being a positive integer greater than 1. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be non-volatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one-bit data, a multi-level cell (MLC) that stores two-bit data, a triple level cell (TLC) that stores three-bit data, or a quad level cell (QLC) capable of storing four-bit data.

In an embodiment, the voltage generator 120, the address decoder 130, and the input/output circuit 140 may be collectively referred to as a peripheral circuit. The peripheral circuit may drive the memory cell array 110 under the control of the control logic 150. The peripheral circuit may drive the memory cell array 110 to perform a program operation, a read operation, and an erase operation.

The voltage generator 120 is configured to generate a plurality of operation voltages using an external power voltage supplied to the memory device 100. The voltage generator 120 operates under the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using the external power voltage or the internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage, and may generate the plurality of operation voltages having various voltage levels by selectively activating the plurality of pumping capacitors under the control of the control logic 150.

The plurality of operation voltages generated by the voltage generator 120 may be supplied to the memory cell array 110 through the address decoder 130.

The address decoder 130 is connected to the memory cell array 110 through the row lines RL. The address decoder 130 is configured to operate under the control of the control logic 150. The address decoder 130 may receive an address ADDR from the control logic 150. The address decoder 130 may decode a block address among the received address ADDR. The address decoder 130 selects at least one memory block among the memory blocks BLK1 to BLKi according to the decoded block address. The address decoder 130 may decode a row address among the received address ADDR. The address decoder 130 may select at least one word line among word lines of the selected memory block according to the decoded row address. In an embodiment, the address decoder 130 may decode a column address among the received address ADDR. The address decoder 130 may connect the input/output circuit 140 and the memory cell array 110 to each other according to the decoded column address.

According to an embodiment of the present disclosure, during the read operation, the address decoder 130 may apply a read voltage to the selected word line, and apply a read pass voltage to unselected word lines, the read pass voltage having a higher voltage level than the read voltage.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, write data may be stored in selected memory cells based on data stored in the plurality of page buffers that corresponds to input data DATA provided by an external device.

During the read operation, read data stored in the selected memory cells may be sensed through the bit lines, and the sensed data may be stored in the page buffers. After that, the data stored in the page buffers is output to the external device as output data DATA.

The control logic 150 may control the address decoder 130, the voltage generator 120, and the input/output circuit 140. The control logic 150 may operate in response to a command CMD transmitted from the external device. The control logic 150 may generate various signals in response to the command CMD and the address ADDR to control the peripheral circuits.

Figure 3:
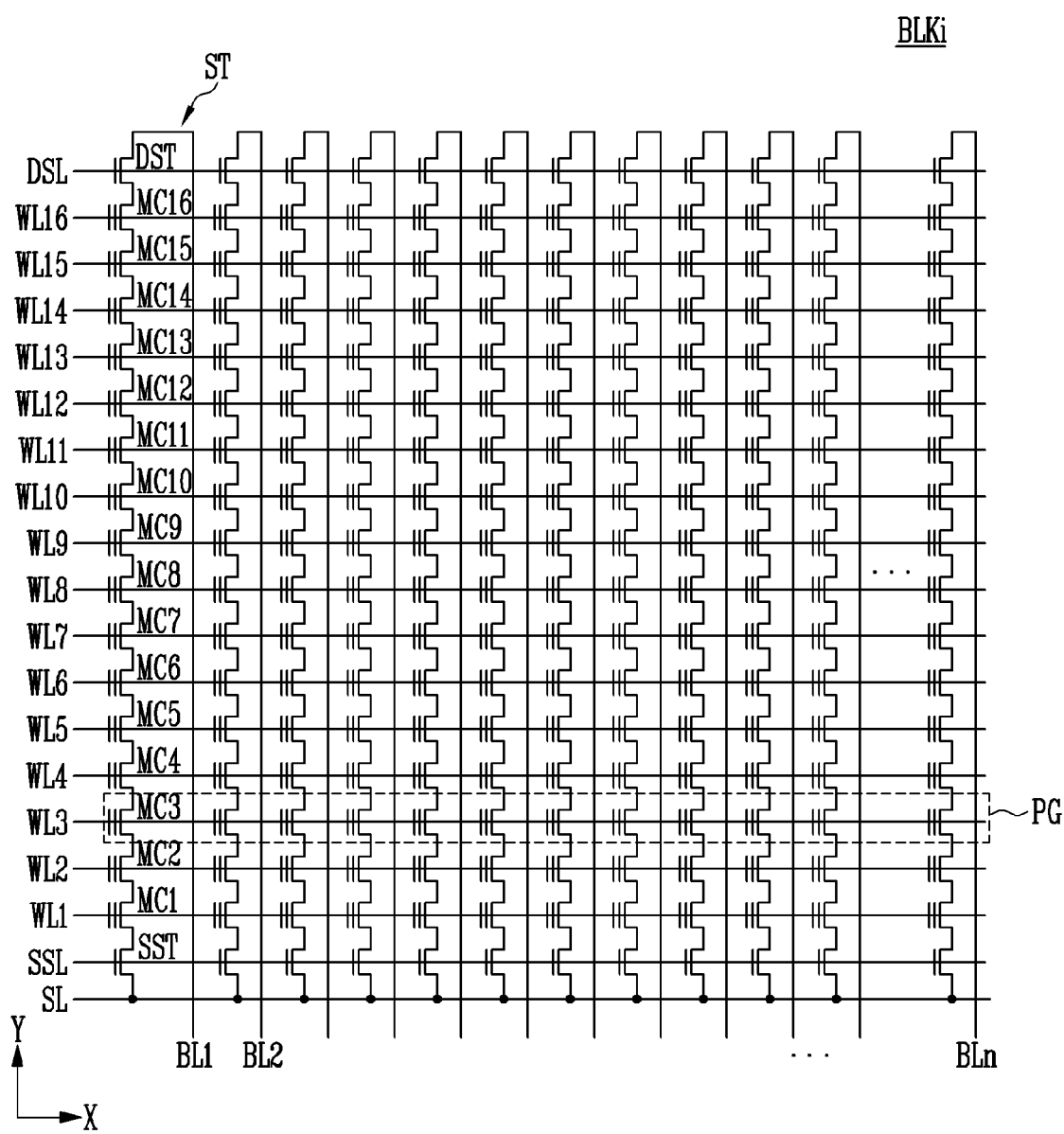
FIG. 3 is a diagram for describing a configuration of any one of memory blocks of FIG. 2.

FIG. 3 is a diagram for describing a configuration of any one of the memory blocks of FIG. 2.

For example, the memory block BLKi is shown in FIG. 3.

Referring to FIG. 3, a plurality of word lines arranged in parallel with each other may be connected between a first select line and a second select line. Here, the first select line may be a source select line SSL, and the second select line may be a drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 will be specifically described as an example.

The string ST may include a source select transistor SST, a plurality of memory cells MC1 to MC16, and a drain select transistor DST connected in series between the source line SL and the first bit line BL1. In an embodiment, one string ST may include at least one of the source select transistor SST and the drain select transistor DST, and may include the memory cells MC1 to MC16, but embodiments are not limited thereto. In another embodiment, the number of memory cells included in one string may be greater than 16.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be commonly connected to the source select line SSL, gates of the drain select transistors DST in the different strings ST may be commonly connected to the drain select line DSL, and gates of the memory cells MC1 to MC16 in the different strings ST may be commonly connected to the plurality of word lines WL1 to WL16, respectively. A group of memory cells connected to the same word line among the memory cells included in the different strings ST may be referred to as a page PG. Therefore, the memory block BLKi may include a plurality of pages PG whose number is the same as the number of the word lines WL1 to WL16.

One memory cell may store one-bit data. This is commonly called a single level cell (SLC). In this case, one physical page PG may store data corresponding to one logical page (LPG). The data corresponding to one logical page (LPG) may include data bits having the same number as cells included in one physical page PG.

In other embodiments, one memory cell may store two or more bits of data. In this case, one physical page PG may store data corresponding to two or more logical pages.

Figure 4:
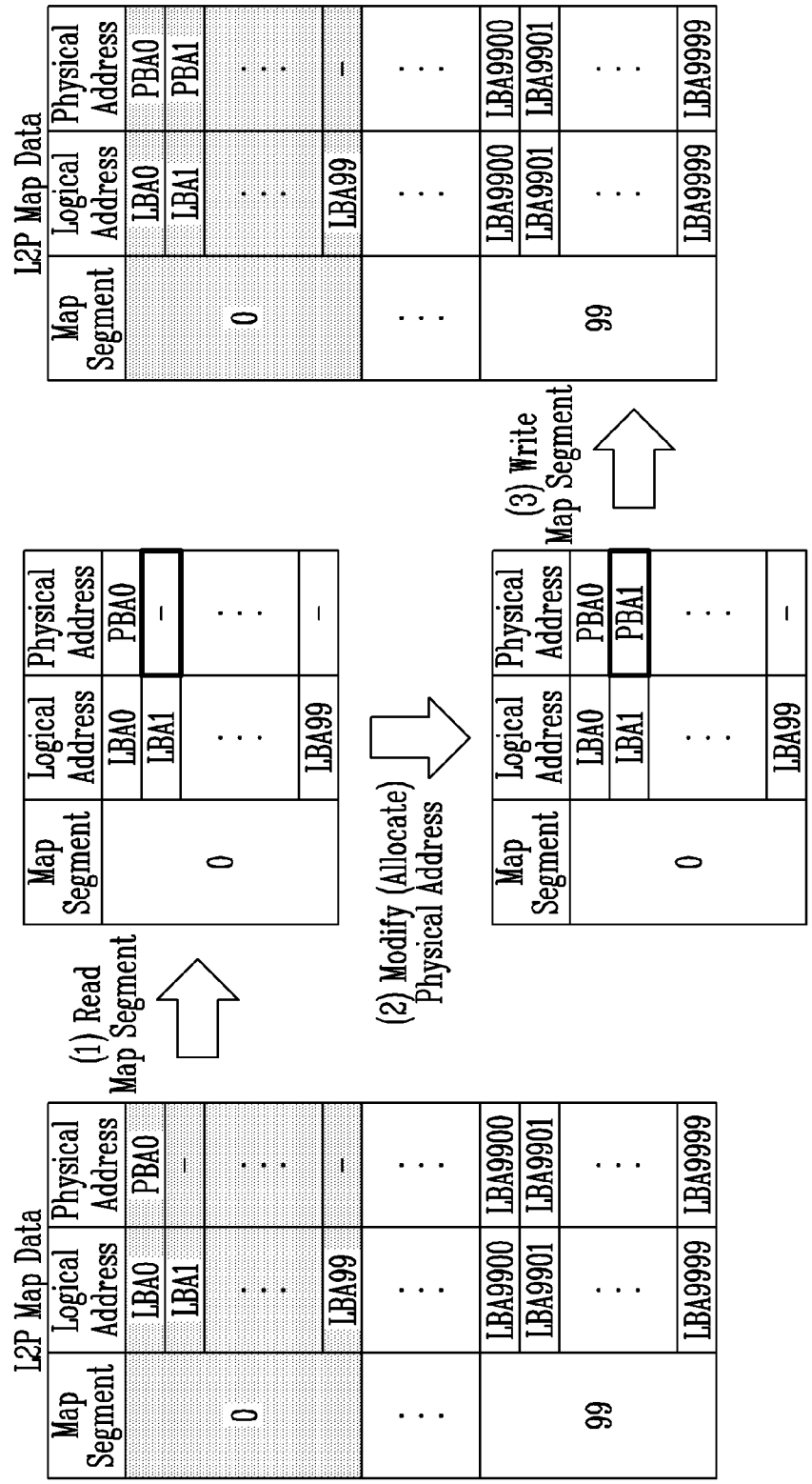
FIG. 4 is a diagram for describing a read-modify-write operation on L2P map data stored in a main memory described with reference to FIG. 1.

FIG. 4 is a diagram for describing a read-modify-write operation on logical-to-physical (L2P) map data stored in the main memory 300 described with reference to FIG. 1.

Referring to FIGS. 1 and 4, the L2P map data stored in the main memory 300 may be updated.

For example, when a write request is input from the host 500, the processor 210 may allocate a physical address to a logical address input from the host 500 according to the write request, and update valid page table information corresponding to the physical address. After that, when a write request for writing new data is input with respect to a previously write requested logical address, previously stored data may become invalid data, and a new physical address may be allocated to the previously write requested logical address. That is, the physical address allocated to the logical address is changed. In the meantime, when a position where data is stored is changed by various background operations such as garbage collection, read reclaim, and wear leveling, the L2P map data may be updated.

The L2P map data may include a plurality of map segments. Each of the map segments may include a plurality of map entries. A map entry may include information on a correspondence relationship between a logical address and a physical address.

Here, it is assumed that a write request of data corresponding to a first logical block address LBA1 is input from the host 500. The processor 210 may read a map segment 0 that includes a map entry of the first logical block address LBA1 among the L2P map data stored in the main memory 300 (1).

The processor 210 may allocate a first physical block address PBA1 as a physical address corresponding to the first logical block address LBA1(2).

The processor 210 may store the map segment 0, which includes the map entry of the first logical block address LBA1 to which the first physical block address PBA1 is allocated, in the main memory 300 (3). As a result, the L2P map data stored in the main memory 300 is updated.

FIG. 5 is a diagram for describing a read-modify-write operation of a valid page table (VPT) of a physical address.

The VPT may include data of a bitmap form indicating whether data stored in pages included in the memory device 100 are valid data. The VPT may include a plurality of bits respectively corresponding to a plurality of pages. A bit of a "set" state may indicate that data stored in a corresponding page is valid data, and a bit of a "clear" state may indicate that data stored in a corresponding page is invalid data.

Referring to FIGS. 1, 4, and 5, a VPT including a zero-th physical block address PBA0 and a first physical block address PBA1 will be described.

In general, when the memory controller 200 stores data in the memory device 100, the memory controller 200 secures a free block, which is an empty memory block storing no data, and then sequentially stores data in pages included in the free block. After storing the data in the pages, bits of the VPT corresponding to the pages are changed to the "set" state. Therefore, before storing the data, all bits of the VPT corresponding to a physical block address to be allocated may be of the "clear" state.

It is assumed that the map segment 0 described with reference to FIG. 4 is in a state in which the zero-th physical block address PBA0 is allocated as a physical address corresponding to the zero-th logical block address LBA0.

When it is assumed that a bit corresponding to a page of the zero-th physical block address PBA0 is a first bit bit1, the processor 210 may read a VPT including the zero-th physical block address PBA0 (501), and modify the "clear" state of the first bit bit1 to the "set" state. In an embodiment, a bit "1" may indicate the "set" state and a bit "0" may indicate the "clear" state. Alternatively, the bit "0" may indicate the "set" state and the bit "1" may indicate the "clear" state. The processor 210 may store the VPT in which the "clear" state of the first bit bit1 is modified to the "set" state in the main memory 300 (503).

Thereafter, since the first physical block address PBA1 is newly allocated as described with reference to FIG. 4, the processor 210 may read the VPT including the first physical block address PBA1 again (505).

When it is assumed that a bit corresponding to a page of the first physical block address PBA1 is a second bit bit2, the processor 210 may modify the "clear" state of the second bit bit2 to the "set" state.

The processor 210 may store the VPT in which the "clear" state of the second bit bit2 is modified to the "set" state in the main memory 300 (507).

In the embodiment described with reference to FIGS. 4 and 5, the main memory 300 may be accessed according to a data access pattern of the firmware (FW), and thus the cache memory 220 may be used accordingly.

For example, when write requests are sequentially input from the host 500, the data access pattern of the main memory 300 may be sequentially performed by the processor 210. That is, the L2P map data and the VPT may be continuously accessed in order to allocate a physical block address for storing data and to store a page of the allocated physical block address as a valid data page. Therefore, access to the L2P map data and the VPT may have very high locality.

Conversely, when write requests are randomly input from the host 500, the data access pattern of the main memory 300 may be processed by the processor 210 in a mixed manner of sequential access and random access. For example, access to the L2P map data may be random, and access to the VPT may be sequential.

Figure 6:
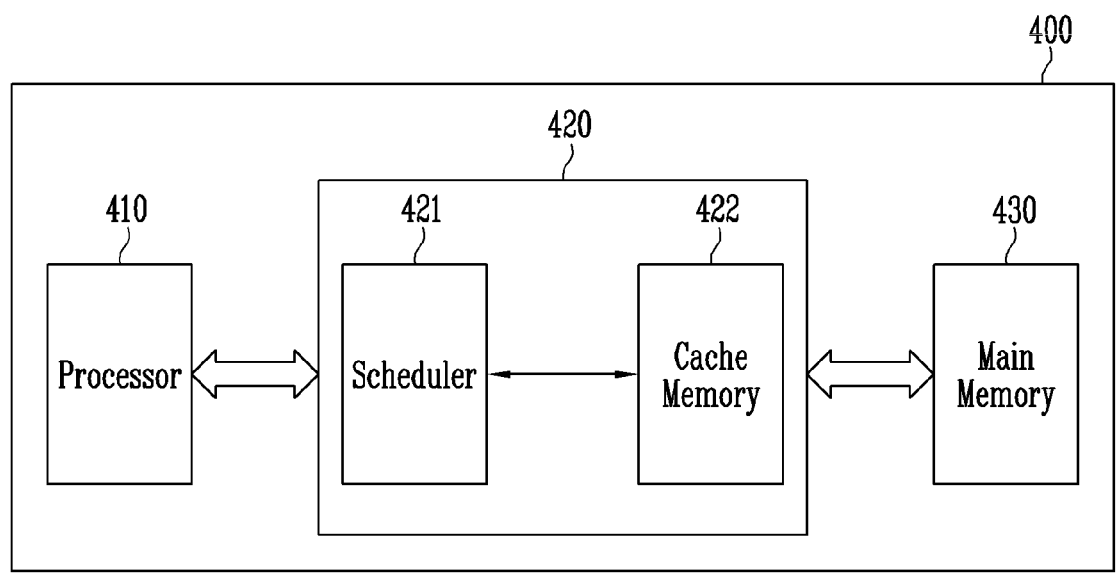
FIG. 6 is a diagram illustrating a structure of a memory controller according to an embodiment of the present disclosure.

FIG. 6 is a diagram illustrating a structure of a memory controller 400 according to an embodiment of the present disclosure.

Referring to FIG. 6, the memory controller 400 may include a processor 410, a cache controller 420, and a main memory 430.

The processor 410 and the main memory 430 may be respectively configured and operate identically to the processor 210 and the main memory 300 described with reference to FIG. 1.

The cache controller 420 may include a scheduler 421 and a cache memory 422.

The scheduler 421 may store access requests input from the processor 410 and addresses corresponding to the access requests. The scheduler 421 may provide an access request to the cache memory 422 or receive a completion response for the provided access request.

The scheduler 421 may receive an access request and an address to be accessed from the processor 410. When the access request received from the processor 410 is a write request, the scheduler 421 may receive the write request, a write address, and write data. The scheduler 421 may transfer the write request, the write address, and the write data to the cache memory 422. The write data may be stored in an area of the main memory 430 corresponding to the write address through the cache memory 422. The main memory 430 may store the write data in the area corresponding to the write address, and then provide a write completion response to the cache controller 420, the write completion response indicating that the write request has been performed. The write completion response may be transferred to the processor 410 through the cache memory 422 and the scheduler 421.

When the access request received from the processor 410 is a read request, the scheduler 421 may receive the read request and a read address. The scheduler 421 may transfer the read request and the read address to the cache memory 422. When data corresponding to the read request is cached in a cache line corresponding to the read address (cache hit), the cache memory 422 may provide the cached data to the scheduler 421. The scheduler 421 may transfer the received data to the processor 410. When the data corresponding to the read request is not cached in the cache line corresponding to the read address (cache miss), the cache memory 422 may provide the read request and the read address to the main memory 430. The main memory 430 may provide read data stored in an area corresponding to the read address to the cache controller 420. The read data may be stored in the cache line corresponding to the read address in the cache memory 422 (caching). The read data may be transferred to the processor 410 through the scheduler 421.

When a read request for an address corresponding to the same cache line as a write request is input before the write request is completed, data stored in the cache memory 422 may be different from data stored in the main memory 430, the read request being input after the write request. In this case, when data corresponding to the read request has been cached in the cache memory 422, the cache hit may occur, and thus the data that is different from the most recent write data may be provided to the processor 410 (hazard occurrence).

In order to prevent the hazard occurrence, when cache lines respectively corresponding to addresses of the input access requests collide, that is, first and second access requests for an address corresponding to the same cache line are input, the scheduler 421 may hold the second access request input after the first access request without transferring the second access request to the cache memory 422 until the first access request is processed.

However, considering the data access pattern of the main memory 430, a phenomenon that many read requests are held or pended inside the scheduler 421 by preceding write requests may frequently occur.

As a result, a read delay occurring in the cache memory 422 may become longer, and thus a processing speed of the processor 410 may be slower.

Figure 7:
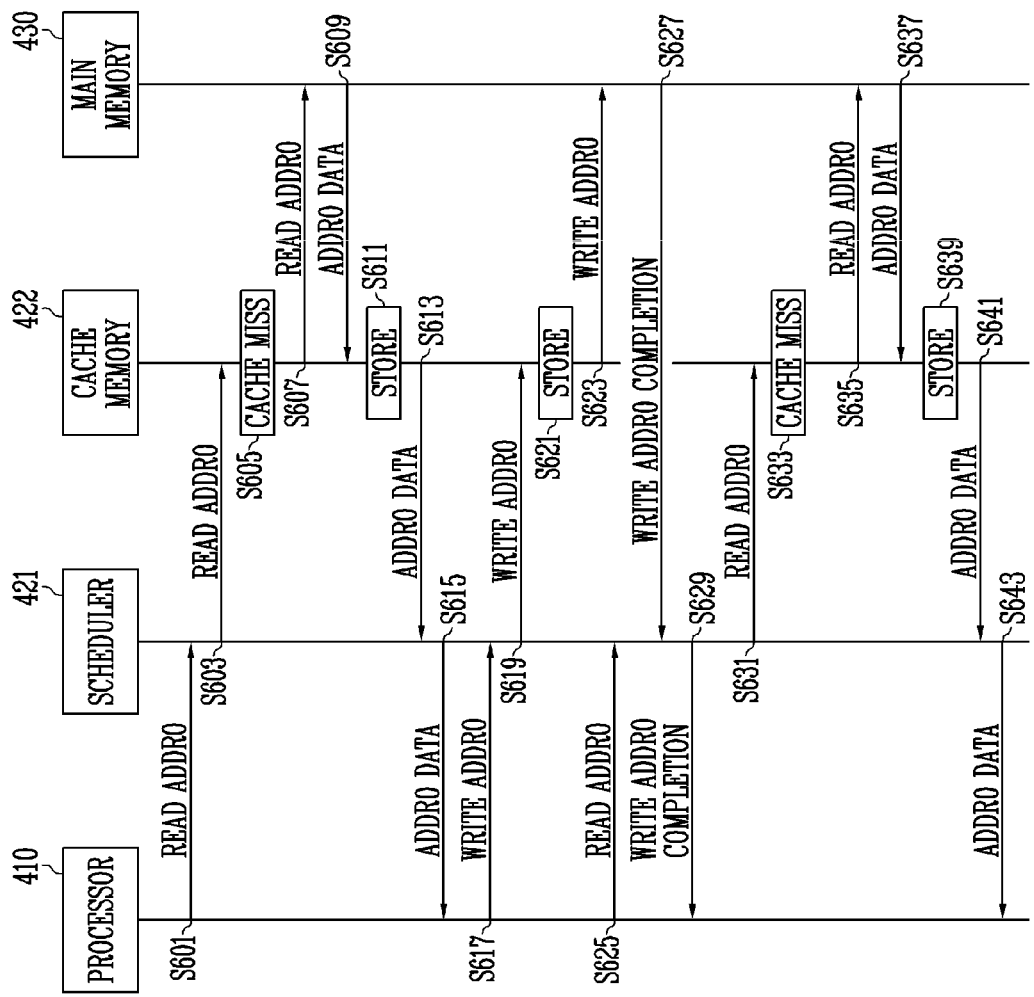
FIG. 7 is a flowchart illustrating an operation of the memory controller described with reference to FIG. 6.

FIG. 7 is a flowchart illustrating an operation of the memory controller 400 described with reference to FIG. 6.

Referring to FIGS. 6 and 7, in step S601, the processor 410 may provide a read request for an address ADDR0 to the scheduler 421.

In step S603, the scheduler 421 may store the read request for the address ADDR0, and since there was no preceding read or write request for the address ADDR0, the scheduler 421 may provide the read request for the address ADDR0 to the cache memory 422.

In step S605, the cache memory 422 may check whether data corresponding to the address ADDR0 has been cached in the cache memory 422. When the data corresponding to the address ADDR0 is not present in the cache memory 422, a cache miss may occur.

When the cache miss occurs, in step S607, the cache memory 422 may provide the read request for the address ADDR0 to the main memory 430.

In step S609, the main memory 430 may read out data corresponding to the address ADDR0, i.e., ADDR0 DATA, and provide the read data ADDR0 DATA to the cache memory 422.

In step S611, the cache memory 422 may store the read data ADDR0 DATA in the cache memory 422 (caching).

In step S613, the cache memory 422 may provide the read data ADDR0 DATA to the scheduler 421. In step S615, the scheduler 421 may provide the read data ADDR0 DATA to the processor 410.

In step S617, the processor 410 may provide a write request for the address ADDR0 to the scheduler 421.

In step S619, the scheduler 421 may provide the write request for the address ADDR0 to the cache memory 422.

In step S621, the cache memory 422 may store write data in the cache memory 422. Alternatively, the write data may not be stored in the cache memory 422, and an indication that data cached in a cache line corresponding to the address ADDR0 is dirty data may be stored in the cache memory 422.

In step S623, the cache memory 422 may provide the write request for the address ADDR0 to the main memory 430.

While the write request is performed in the main memory 430, in step S625, the processor 410 may provide another read request for the address ADDR0 to the scheduler 421. In this case, since the scheduler 421 has not yet received a write request completion response WRITE ADDR0 COMPLETION for the address ADDR0 that is the same address as the address ADDR0 for the other read request, the other read request is not output to the cache memory 422 and held or pended in the scheduler 421.

In step S627, the main memory 430 may perform the write request for the address ADDR0, i.e., store the write data in an area corresponding to the address ADDR0, and provide the write completion response WRITE ADDR0 COMPLETION to the scheduler 421.

In step S629, the scheduler 421 may provide the write completion response WRITE ADDR0 COMPLETION to the processor 410.

In step S631, the scheduler 421 may provide the other read request for the address ADDR0 to the cache memory 422.

In step S633, the cache memory 422 may check whether newly written data corresponding to the address ADDR0 has been cached in the cache memory 422. Since the newly written data corresponding to the address ADDR0 has not been cached in the cache memory 422, the cache miss may occur.

In step S635, the cache memory 422 may provide the other read request for the address ADDR0 to the main memory 430.

In step S637, the main memory 430 may read out the newly written data corresponding to the address ADDR0, i.e., ADDR0 DATA, and provide the read data ADDR0 DATA to the cache memory 422.

In step S639, the cache memory 422 may store the read data ADDR0 DATA in the cache memory 422 (caching).

In step S641, the cache memory 422 may provide the read data ADDR0 DATA to the scheduler 421. In step S643, the scheduler 421 may provide the read data ADDR0 DATA to the processor 410.

According to the embodiment described with reference to FIG. 7, when there is collision among the cache lines respectively corresponding to the addresses of the input access requests, e.g., when first and second access requests corresponding to an address corresponding to the same cache line are sequentially input, the scheduler 421 may hold the second access request without transferring the second access request to the cache memory 422 until the first access request is processed. Therefore, considering the data access pattern of the main memory 430 processed by the processor 410, a phenomenon that many read requests are held or pended inside the scheduler 421 by the preceding write requests may frequently occur. As a result, the read delay occurring in the cache memory 422 may become longer, and thus the process speed of the processor 410 may be slower.

Figure 8:
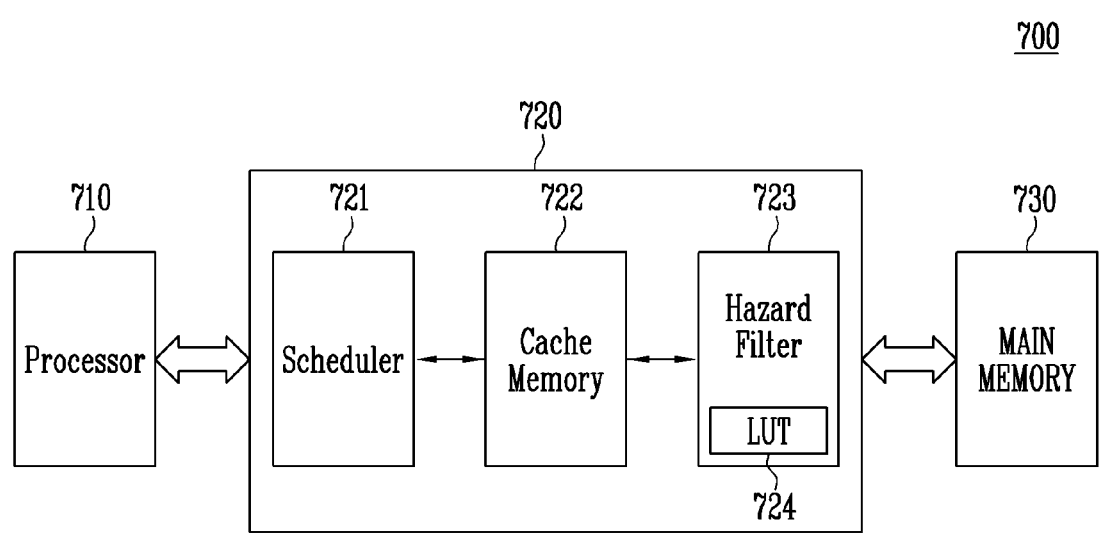
FIG. 8 is a diagram for describing a structure of a memory controller according to another embodiment of the present disclosure.

FIG. 8 is a diagram for describing a structure of a memory controller 700 according to an embodiment of the present disclosure.

Referring to FIG. 8, the memory controller 700 may include a processor 710, a cache controller 720, and a main memory 730.

The processor 710 and the main memory 730 may be configured and operate identically to the processors 210 and 410 and the main memories 230 and 430, respectively, described with reference to FIGS. 1 and 6.

The cache controller 720 may include a scheduler 721, a cache memory 722, and a hazard filter 723.

The scheduler 721 may store access requests input from the processor 710, and addresses corresponding to the access requests. The scheduler 721 may provide an input access request to the cache memory 722 or receive a completion response for the provided access request.

The scheduler 721 may receive at least the access request and an address to be accessed, from the processor 710. When the access request received from the processor 710 is a write request, the scheduler 721 may receive the write request, a write address, and write data. The scheduler 721 may transfer the write request, the write address, and the write data to the cache memory 722. The write data may be provided to the hazard filter 723 through the cache memory 722.

When the access request received from the processor 710 is a read request, the scheduler 721 may receive the read request and a read address. The scheduler 721 may transfer the read request and the read address to the cache memory 722. When data corresponding to the read address has been cached in a cache line corresponding to the read address (cache hit), the cache memory 722 may provide the cached data to the scheduler 721. The scheduler 721 may transfer the received data to the processor 710. When the data corresponding to the read address has not been cached in the cache line corresponding to the read address (cache miss), the cache memory 722 may provide the read request and the read address to the main memory 730. The main memory 730 may provide read data stored in an area corresponding to the read address to the cache controller 720. The read data may be stored in the cache line corresponding to the read address in the cache memory 722 (caching). The read data may be transferred to the processor 710 through the scheduler 721.

When a read request for an address is input before a write request for the address corresponding to the same cache line as the read request is completed, data stored in the cache memory 722 may be previous data that is different from write data recently stored in the main memory 730 in response to the write request. In this case, when data corresponding to the read request has been cached in the cache memory 722, the cache hit may occur, and thus the previous data stored in the cache memory 722 that is different from the most recent write data may be provided to the processor 710 (hazard occurrence).

In order to prevent the hazard occurrence, when cache lines respectively corresponding to addresses of the input access requests collide, that is, access requests for an address corresponding to the same cache line are sequentially input, the scheduler 721 may hold a later input access request without transferring the later input access request to the cache memory 722 until a first input access request is processed.

For example, it is assumed that the first input access request is a write request and the later input access request is a read request, the first input access request and the later input access request being for an address corresponding to the same cache line. In this case, the scheduler 721 may hold the read request without transferring the read request to the cache memory 722 until the write request is completed in the main memory 730.

The hazard filter 723 may receive the write request, a write address, and write data that have passed through the scheduler 721 and the cache memory 722, and store the write request and/or the write address in an internal lookup table LUT. Thereafter, the hazard filter 723 may provide the write request, the write address, and the write data to the main memory 730. In an embodiment, when the write request is received from the cache memory 722 or the write request is provided to the main memory 730, the hazard filter 723 may provide a pre-write completion response to the scheduler 721 before receiving a write completion response from the main memory 730.

The scheduler 721 may provide the read request held or pended by the scheduler 721 and a read address to the cache memory 722 after receiving the pre-write completion response from the hazard filter 723. When the cache miss for the read request occurs in the cache memory 722, the hazard filter 723 may receive the read request. The hazard filter 723 may check whether a write request for the same address as the read address is included in the internal lookup table LUT.

When the write request for the same address as the read address is stored in the internal lookup table LUT, the hazard filter 723 may hold the read request until the write completion response is received from the main memory 730. When the write request for the same address as the read address is not stored in the internal lookup table LUT, the hazard filter 723 may provide the read request to the main memory 730.

That is, the hazard filter 723 may issue the pre-write completion response for the write request to the scheduler 721 before receiving the write completion response from the main memory 730, and process a hazard situation that may occur later. Therefore, the read delay may be improved.

Figure 9:
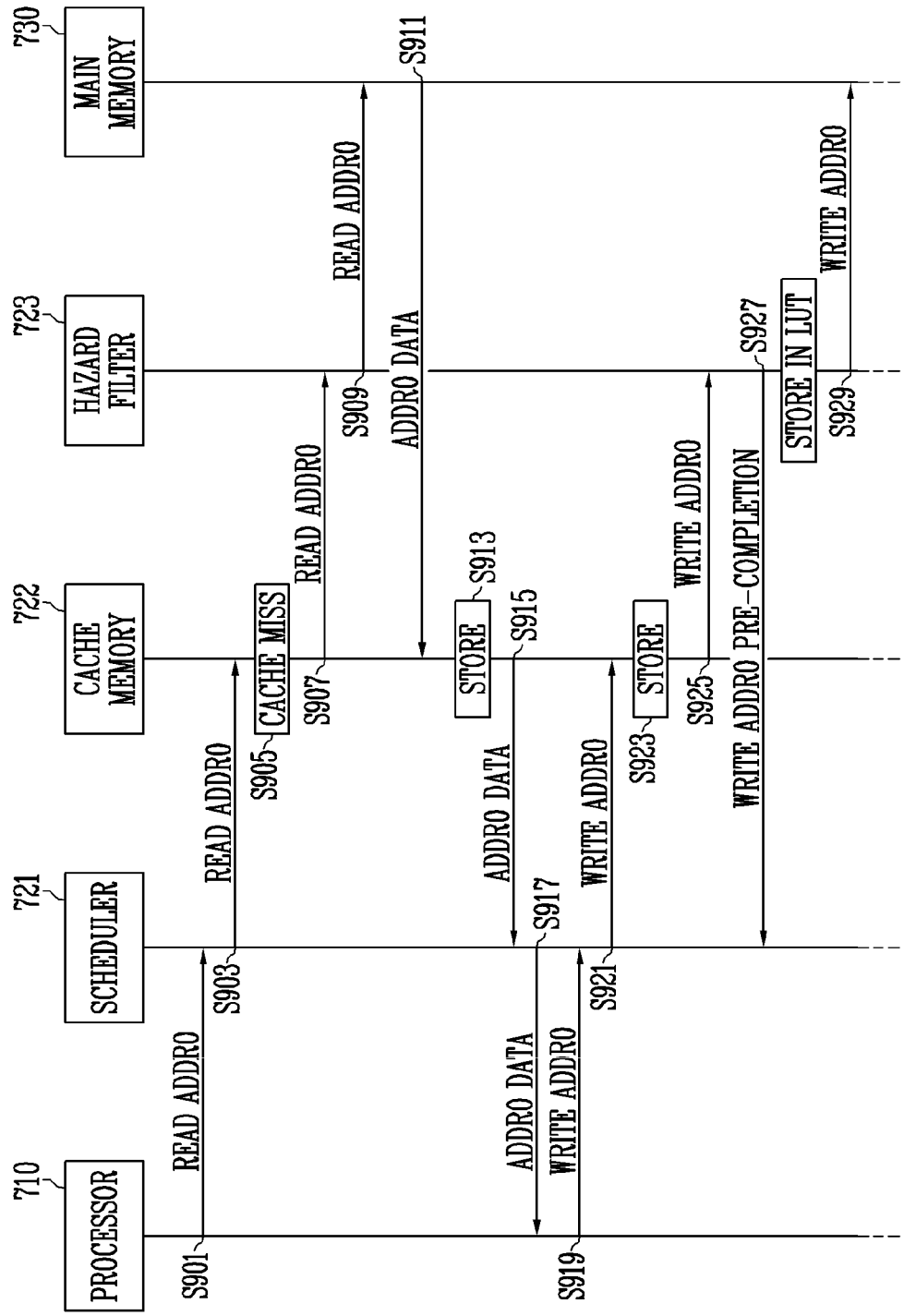
FIGS. 9 and 10 are flowcharts for describing an operation of the memory controller described with reference to FIG. 8.
Figure 10:
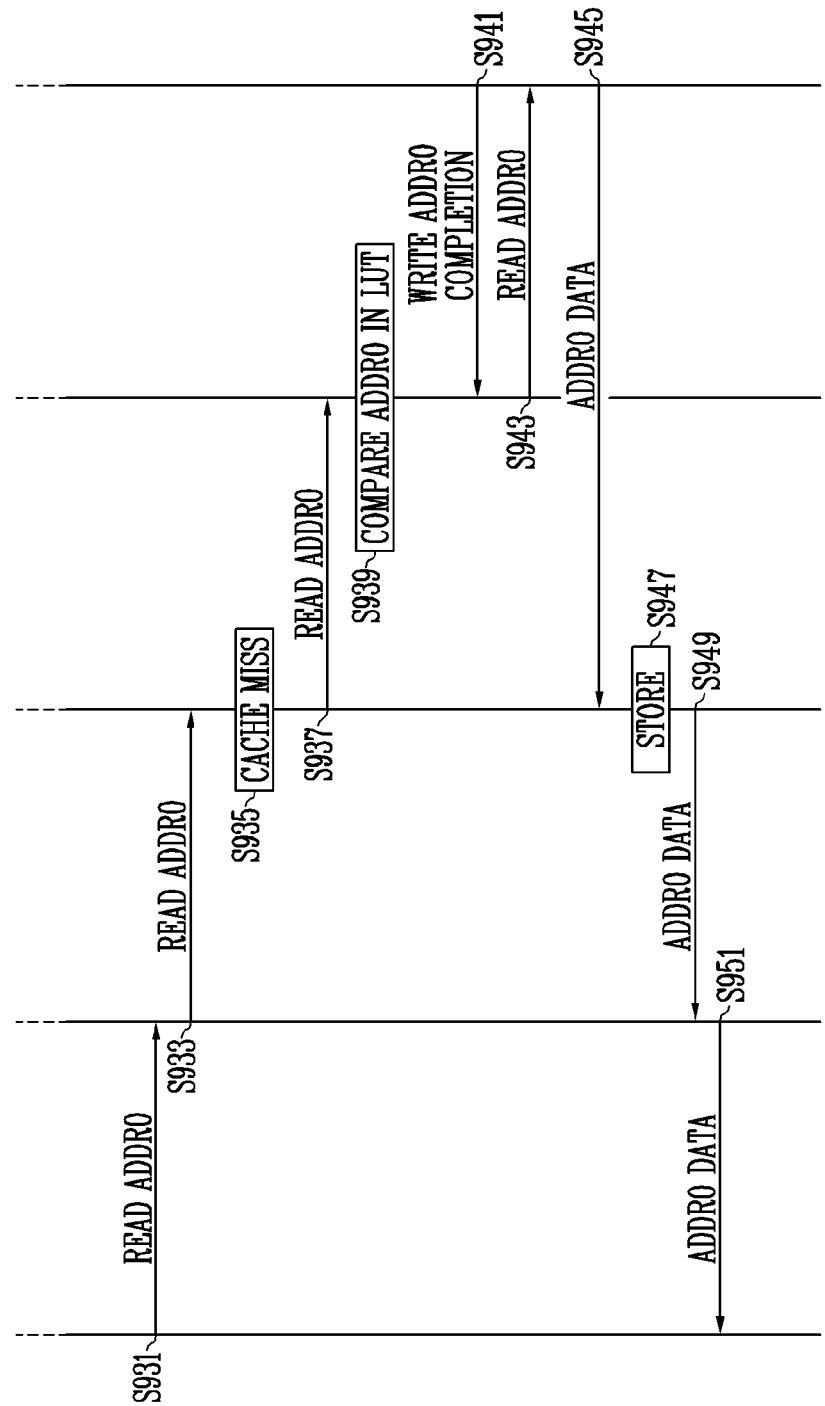

FIGS. 9 and 10 are flowcharts for describing an operation of the memory controller 700 of FIG. 8.

Referring to FIGS. 9 and 10, in step S901, the processor 710 may provide a read request for an address ADDR0 to the scheduler 721.

In step S903, the scheduler 721 may store the read request for the address ADDR0. When there is no preceding read or write request for the address ADDR0, the scheduler 721 may provide the read request for the address ADDR0 to the cache memory 722.

In step S905, the cache memory 722 may check whether data corresponding to the address ADDR0 has been cached in the cache memory 722. When the data corresponding to the address ADDR0 has not been cached in the cache memory 722, the cache miss may occur.

When the cache miss occurs, in step S907, the cache memory 722 may provide the read request for the address ADDR0 to the hazard filter 723.

In step S909, the hazard filter 723 may transfer the read request for the address ADDR0 to the main memory 730.

In step S911, the main memory 730 may read out data corresponding to the address ADDR0, i.e., ADDR0 DATA, and provide the read data ADDR0 DATA to the cache memory 722.

In step S913, the cache memory 722 may store the read data ADDR0 DATA in the cache memory 722 (caching).

In step S915, the cache memory 722 may provide the read data ADDR0 DATA to the scheduler 721. In step S917, the scheduler 721 may provide the read data ADDR0 DATA to the processor 710.

In step S919, the processor 710 may provide a write request for the address ADDR0 to the scheduler 721.

In step S921, the scheduler 721 may provide the write request for the address ADDR0 to the cache memory 722.

In step S923, the cache memory 722 may store write data in the cache memory 722. In another embodiment, the write data may not be stored in the cache memory 722, and an indication that data cached in a cache line corresponding to the address ADDR0 is dirty data may be stored in the cache memory 722.

In step S925, the cache memory 722 may provide the write request for the address ADDR0 to the hazard filter 723.

In step S927, the hazard filter 723 may provide a pre-write completion response to the scheduler 721. In addition, the write address ADDR0 may be stored in an internal lookup table of the hazard filter 723.

In step S929, the hazard filter 723 may provide the write request to the main memory 730.

While the write request is performed in the main memory 730, in step S931, the processor 710 may provide another read request for the address ADDR0 to the scheduler 721.

In step S933, since the scheduler 721 already received the pre-write request completion response for the address ADDR0, which is the same address as the address ADDR0 for the other read request, from the hazard filter 723, the scheduler 721 may provide the other read request for the address ADDR0 to the cache memory 722.

In step S935, the cache memory 722 may check whether data corresponding to the address ADDR0 has been cached in the cache memory 722. When the data corresponding to the address ADDR0 has not been cached in the cache memory 722, the cache miss may occur.

When the cache miss occurs, in step S937, the cache memory 722 may provide the other read request for the address ADDR0 to the hazard filter 723.

In step S939, the hazard filter 723 may determine whether the write request for the same address as the other read request is stored in the internal lookup table LUT. As a result of the determination, when the write request for the same address as the other read request is stored in the internal lookup table LUT and a write completion response to the write request has not been yet received, the other read request for the address ADDR0 may be held or pended in the hazard filter 723.

In step S941, the main memory 730 may provide the write completion response to the hazard filter 723. Although not shown, the hazard filter 723 may remove information on the write request, e.g., the write request or the address corresponding to the write request, from the lookup table LUT when the write completion response is received from the main memory 730.

In step S943, the hazard filter 723 may provide the other read request for the address ADDR0 to the main memory 730.

In step S945, the main memory 730 may read out read data corresponding to the address ADDR0, i.e., ADDR0 DATA, and provide the read data ADDR0 DATA to the cache memory 722.

In step S947, the cache memory 722 may store the read data ADDR0 DATA in the cache memory 722 (caching).

In step S949, the cache memory 722 may provide the read data ADDR0 DATA to the scheduler 721. In step S951, the scheduler 721 may provide the read data ADDR0 DATA to the processor 710.

In an embodiment, when the processor 710 provides a read request following a write request to the cache controller 720, if the write request is not for the same address as the read request and thus a write request for the same address is not stored in the internal lookup table LUT, the hazard filter 723 may provide the read request to the main memory 730 without waiting for a write request completion response.

According to the above-described operations in the cache controller 720, a read delay may be reduced, and thus a processing speed of the processor 410 may be fast.

Figure 11:
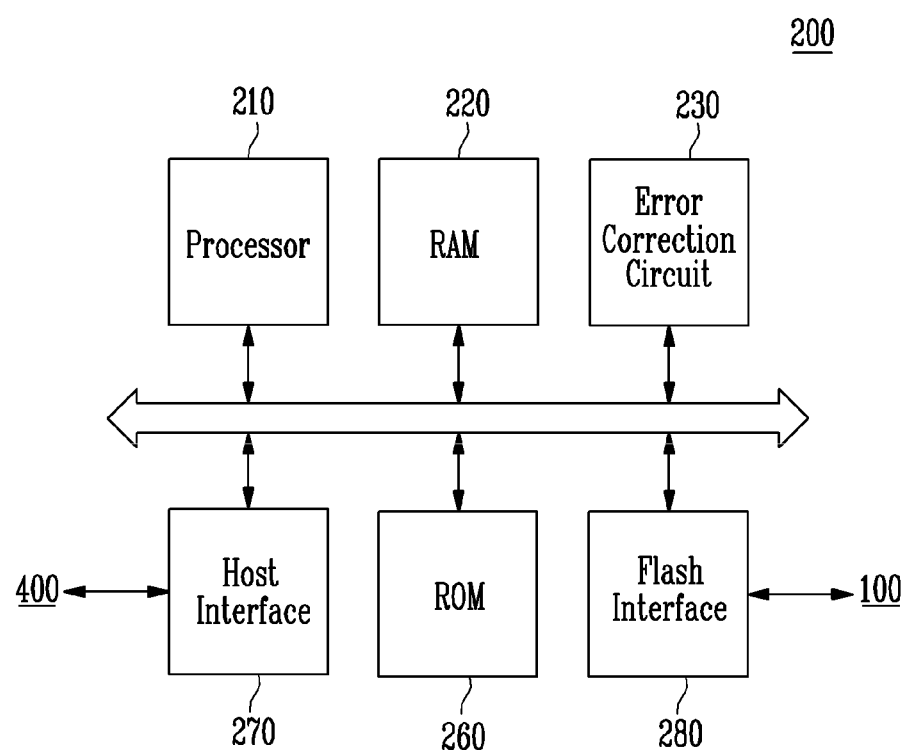
FIG. 11 is a diagram illustrating an embodiment of the memory controller of FIG. 1.

FIG. 11 is a diagram illustrating the memory controller 200 of FIG. 1 according to an embodiment.

Referring to FIGS. 1 and 11, the memory controller 200 may include a processor 210, a RAM 220, an error correction circuit 230, a ROM 260, a host interface 270, and a flash interface 280.

The processor 210 may control overall operations of the memory controller 200. The RAM 220 may be used as a buffer memory, a cache memory, and an operation memory of the memory controller 200. For example, the cache memory 220 described with reference to FIG. 1 may be the RAM 220. In an embodiment, the RAM 220 may be an SRAM.

The ROM 260 may store various information required for an operation of the memory controller 200 in a firmware form.

The memory controller 200 may communicate with an external device (for example, the host 500, an application processor, or the like) through the host interface 270.

The memory controller 200 may communicate with the memory device 100 through the flash interface 280. The memory controller 200 may transmit a command CMD, an address ADDR, and a control signal CTRL to the memory device 100 through the flash interface 280 and receive data DATA read out of the memory device 100. For example, the flash interface 280 may include a NAND interface.

Figure 12:
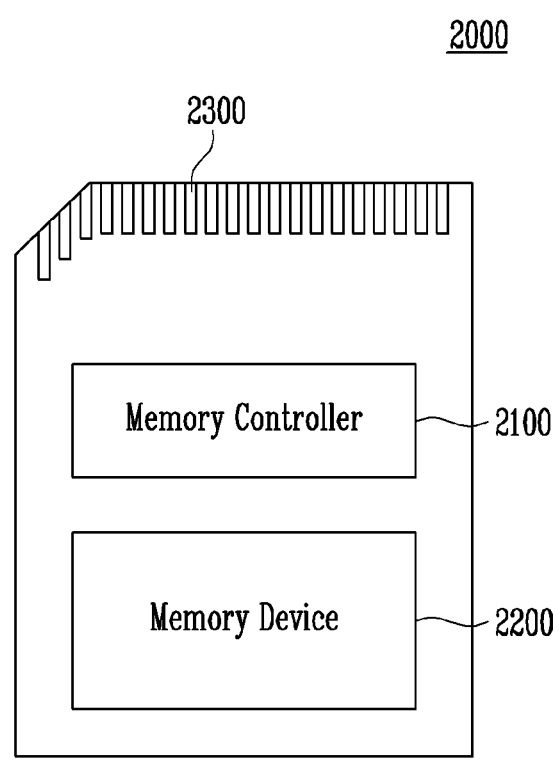
FIG. 12 is a block diagram illustrating a memory card system to which the storage device according to an embodiment of the present disclosure is applied.

FIG. 12 is a block diagram illustrating a memory card system 2000 to which the storage device according to an embodiment of the present disclosure is applied.

Referring to FIG. 12, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host (not shown). The memory controller 2100 is configured to drive firmware for controlling the memory device 2200. The memory controller 2100 may be implemented with the memory controller 200 described with reference to FIG. 1.

For example, the memory controller 2100 may include components such as a random access memory (RAM), a processor, a host interface, a memory interface, an error corrector, and so on.

The memory controller 2100 may communicate with an external device, e.g., the host, through the connector 2300. The memory controller 2100 may communicate with the external device according to a specific communication standard. For example, the memory controller 2100 is configured to communicate with the external device according to at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, an NVMe, and so on. For example, the connector 2300 may be defined by at least one of the various communication standards described above.

For example, the memory device 2200 may be configured of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), a spin-torque magnetic RAM (STT-MRAM), and so on.

The memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMC-micro, or eMMC), an SD card (SD, miniSD, microSD, or SDHC), a universal flash storage (UFS), or the like.

Figure 13:
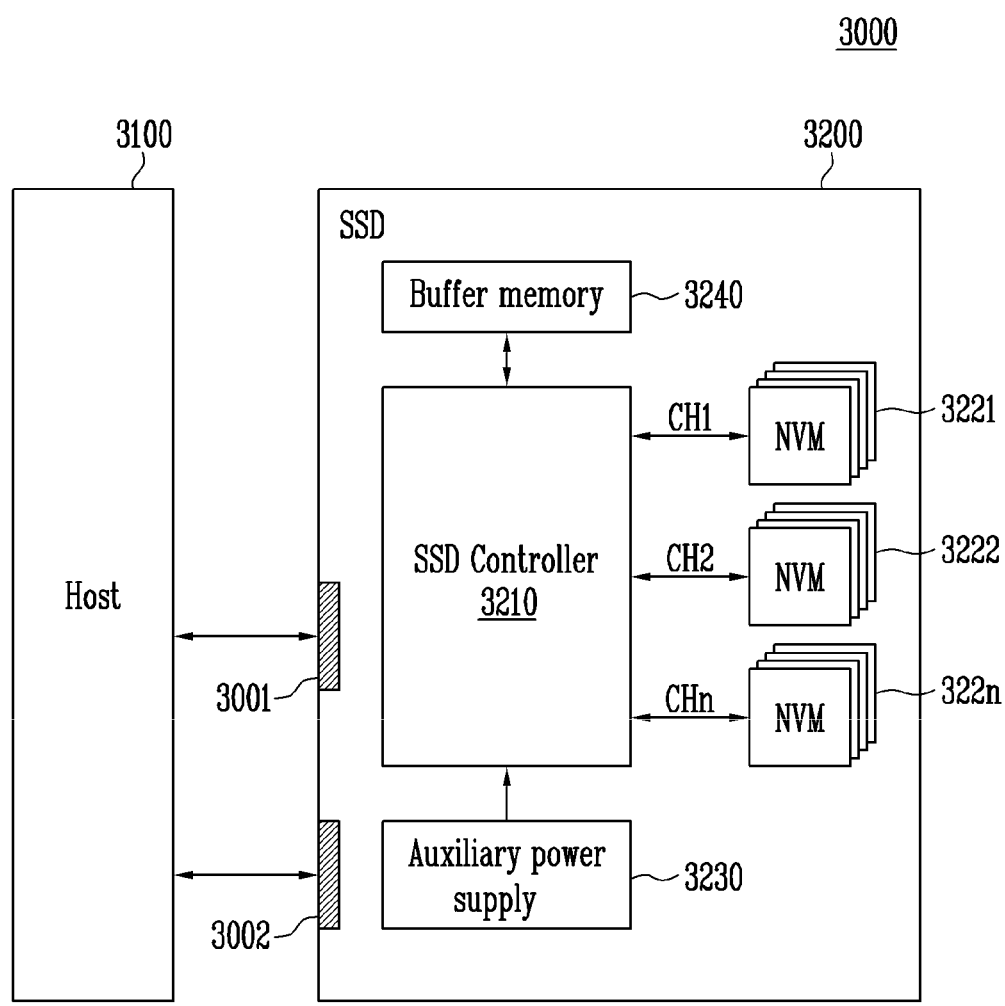
FIG. 13 is a block diagram illustrating a solid state drive (SSD) system to which the storage device according to an embodiment of the present disclosure is applied.

FIG. 13 is a block diagram illustrating a solid state drive (SSD) system 3000 to which the storage device according to an embodiment of the present disclosure is applied.

Referring to FIG. 13, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interface standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, an NVMe, and so on.

The auxiliary power device 3230 is connected to the host 3100 through the power connector 3002. The auxiliary power device 3230 may receive the power PWR from the host 3100 and may charge the power PWR therein. The auxiliary power device 3230 may provide auxiliary power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide the auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) for the flash memories 3221 to 322n. The buffer memory 3240 may include a volatile memory such as a DRAM, an SDRAM, a DDR SDRAM, an LPDDR SDRAM, a GRAM, or the like, or a non-volatile memory such as an FRAM, a ReRAM, an STT-MRAM, a PRAM, or the like.

Figure 14:
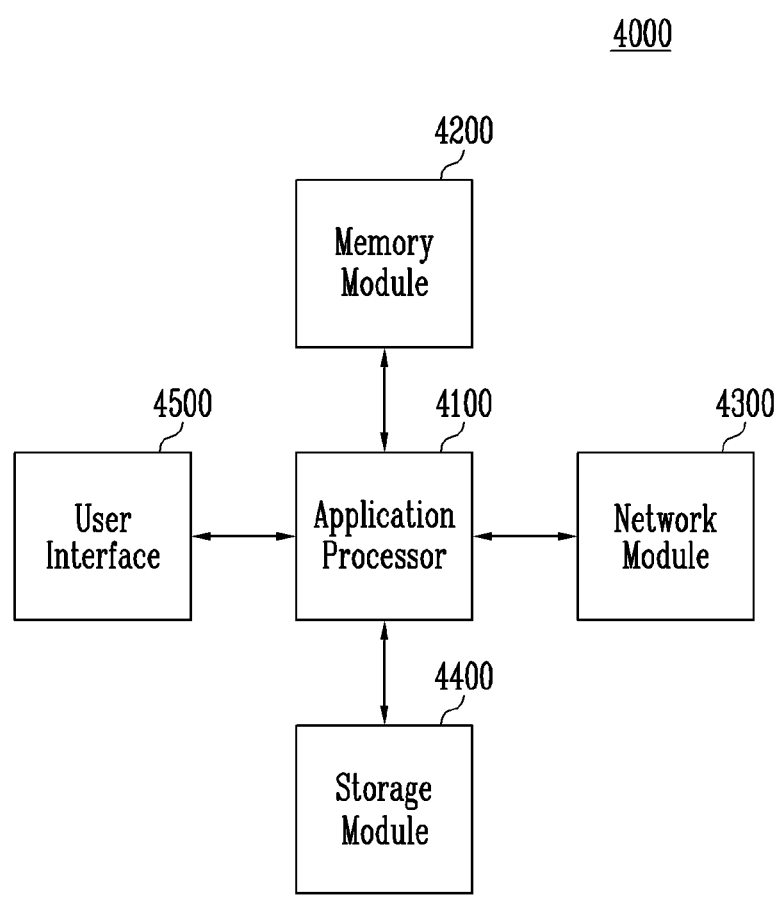
FIG. 14 is a block diagram illustrating a user system to which the storage device according to an embodiment of the present disclosure is applied.

FIG. 14 is a block diagram illustrating a user system 4000 to which the storage device according to an embodiment of the present disclosure is applied.

Referring to FIG. 14, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, an LPDDR3 SDRAM, or the like, or a non-volatile random access memory, such as a PRAM, a ReRAM, an MRAM, an FRAM, or the like. For example, the application processor 4100 and the memory module 4200 may be packaged based on a package on package (POP) and provided as one semiconductor device.

The network module 4300 may communicate with external devices. For example, the network module 4300 may support wireless communications such as code division multiple access (CDMA), global system for mobile communications (GSM), wideband CDMA (WCDMA), CDMA-2000, time division multiple access (TDMA), long term evolution, Wimax, WLAN, UWB, Bluetooth, Wi-Fi, and so on. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, a three-dimensional NAND flash, or the like. For example, the storage module 4400 may be provided as a removable storage device (removable drive), such as a memory card, or an external drive of the user system 4000.

For example, the storage module 4400 may include a plurality of non-volatile memory devices, and the plurality of non-volatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include one or more of user input interfaces such as a keyboard, a keypad, a button, a touch panel, a touch screen, a touch pad, a touch ball, a camera, a microphone, a gyroscope sensor, a vibration sensor, a piezoelectric element, and so on. The user interface 4500 may include one or more of user output interfaces such as a liquid crystal display (LCD), an organic light emitting diode (OLED) display device, an active matrix OLED (AMOLED) display device, an LED, a speaker, a monitor, and so on.

While various embodiments have been described above, it will be understood to those skilled in the art that the embodiments described are by way of example only. Accordingly, the system and device described herein should not be limited based on the described embodiments.

What is claimed is:

1. A memory controller comprising:
    a main memory configured to temporarily store data read from a non-volatile memory;
    a processor configured to generate commands for accessing data stored in the main memory;
    a scheduler configured to store the commands and output the commands according to a preset criterion;
    a cache memory configured to cache and store data accessed by the processor among the data stored in the main memory; and
    a hazard filter configured to store information on an address of the main memory corresponding to a write command among the commands, provide a pre-completion response for receiving the write command to the scheduler upon receiving the write command from the scheduler, and provide the write command to the main memory,
    wherein the pre-completion response is provided to the scheduler before writing data corresponding to the write command to the main memory,
    wherein the scheduler outputs, to the cache memory, a read command corresponding to a same address as the address of the main memory corresponding to the write command, in response to reception of the pre-completion response,
    wherein, when data corresponding to the read command is stored in the cache memory, the cache memory provides the data corresponding to the read command to the scheduler while writing the data corresponding to the write command to the main memory, and
    wherein, when the data corresponding to the read command is not stored in the cache memory, the hazard filter provides the read command to the main memory according to whether a write completion response for the write command is received from the main memory.

2. The memory controller of claim 1, wherein the scheduler holds the read command without outputting the read command to the cache memory until the pre-completion response for the write command is received from the hazard filter.

3. The memory controller of claim 1, wherein the scheduler outputs commands for different addresses among addresses of the main memory according to a sequence of the commands received from the processor.

4. The memory controller of claim 1, wherein when the read command for the address of the main memory corresponding to the write command is input, the hazard filter provides the read command to the main memory after the write completion response for the write command is received from the main memory.

5. The memory controller of claim 1, wherein when the data corresponding to the read command among the commands is stored in a cache line corresponding to an address of the read command, the cache memory provides the data stored in the cache line to the scheduler.

6. The memory controller of claim 1, wherein when the data corresponding to the read command among the commands is absent in a cache line corresponding to an address of the read command, the cache memory transfers the read command to the hazard filter.

7. The memory controller of claim 1, wherein the hazard filter includes a lookup table storing the information on the address of the main memory corresponding to the write command.

8. The memory controller of claim 7, wherein when the write completion response for the write command is received from the main memory, the hazard filter removes the information on the address of the main memory corresponding to the write command from the lookup table.

9. The memory controller of claim 1, wherein a plurality of addresses of the main memory are mapped with one address of the cache memory in caching data from the main memory to the cache memory.

10. The memory controller of claim 1, wherein the main memory is a dynamic random access memory.

11. The memory controller of claim 1, wherein the cache memory is a static random access memory.

12. A memory controller comprising:
    a main memory configured to temporarily store main data read from a non-volatile memory in areas corresponding to a plurality of main memory addresses;
    a cache memory configured to cache and store a portion of the main data in cache lines corresponding to the plurality of main memory addresses;
    a processor configured to generate commands for accessing the main data;
    a scheduler configured to provide the commands to the cache memory according to a sequence of generating the commands; and
    a hazard filter configured to provide a pre-write completion response to the scheduler in response to reception of a write command among the commands received from the scheduler, and provide the write command to the main memory to perform an operation corresponding to the write command,
    wherein the pre-write completion response is provided to the scheduler before writing data corresponding to the write command to the main memory,
    wherein the scheduler outputs, to the cache memory, a read command corresponding to a same address as an address of the main memory corresponding to the write command in response to reception of the pre-write completion response,
    wherein, when data corresponding to the read command is stored in the cache memory, the cache memory provides the data corresponding to the read command to the scheduler while writing the data corresponding to the write command to the main memory, and wherein, when the data corresponding to the read command is not stored in the cache memory, the hazard filter provides the read command to the main memory according to whether a write completion response for the write command is received from the main memory.

13. The memory controller of claim 12, wherein the hazard filter includes a lookup table storing a main memory address corresponding to the write command among the plurality of main memory addresses.

14. The memory controller of claim 13, wherein the hazard filter provides the read command to the main memory according to whether a main memory address corresponding to the read command is stored in the lookup table, in response to the read command among the commands.

15. The memory controller of claim 12, wherein any empty cache line among the cache lines is configured to cache data from the area corresponding to the plurality of main memory addresses, the empty cache line storing no data.

16. The memory controller of claim 12, wherein when the data corresponding to the read command among the commands is stored in a cache line corresponding to a main memory address of the read command, the cache memory provides the data stored in the cache line to the scheduler.

17. The memory controller of claim 12, wherein when the data corresponding to the read command among the commands is absent in a cache line corresponding to a main memory address of the read command, the cache memory transfers the read command to the hazard filter.

18. The memory controller of claim 12, wherein the main memory is a dynamic random access memory.

19. The memory controller of claim 12, wherein the cache memory is a static random access memory.

\* \* \* \* \*